United States Patent
Steger et al.

(10) Patent No.: US 7,839,269 B2
(45) Date of Patent: Nov. 23, 2010

(54) METHOD AND APPARATUS FOR DISTRIBUTING HAPTIC SYNCHRONOUS SIGNALS

(75) Inventors: Ryan Steger, Sunnyvale, CA (US); Barbara Kruse, San Francisco, CA (US)

(73) Assignee: Immersion Corporation, San Jose, CA (US)

(*) Notice: Subject to any disclaimer, the term of this patent is extended or adjusted under 35 U.S.C. 154(b) by 365 days.

(21) Appl. No.: 11/954,690

(22) Filed: Dec. 12, 2007

(65) Prior Publication Data

US 2009/0153350 A1    Jun. 18, 2009

(51) Int. Cl.
*H04B 3/36* (2006.01)

(52) U.S. Cl. .............. 340/407.1; 340/426.19; 340/429; 340/545.5; 340/549; 340/815.57; 340/815.83; 345/156; 345/157; 345/162; 345/168; 345/173

(58) Field of Classification Search .......... 340/407.1, 340/815.57, 815.83, 429, 426.19, 549, 545.5; 345/156, 157, 162, 168, 173
See application file for complete search history.

(56) References Cited

U.S. PATENT DOCUMENTS 6,411,276 B1 * 6/2002 Braun et al. ............. 345/156
2004/0260470 A1   12/2004 Rast
2005/0017947 A1 * 1/2005 Shahoian et al. ......... 345/156
2006/0061545 A1   3/2006 Hughes et al.
2006/0206833 A1   9/2006 Capper et al.
2006/0282170 A1 * 12/2006 Hardwick et al. ......... 623/22.3
2007/0091063 A1   4/2007 Nakamura et al.
2007/0168118 A1   7/2007 Lappe et al.

* cited by examiner

*Primary Examiner*—Tai T Nguyen
(74) *Attorney, Agent, or Firm*—Womble Carlyle Sandridge & Rice, PLLC (57) ABSTRACT

A haptic signal distribution system capable of distributing haptic synchronous signals includes a master haptic device and groups of slave haptic devices. In one embodiment, the master haptic device is configured to distribute haptic synchronous signals to slave haptic devices. The haptic synchronous signals, for instance, may include information relating to a tempo for a piece of music. A haptic signal distribution system, for example, allows a master wearable haptic device to selectively distribute haptic synchronous signals to one or more groups of slave wearable haptic devices via a wireless communications network. Upon receipt of the haptic synchronous signals, each slave wearable haptic device generates a series of haptic feedback having a rhythm of beats in response to the haptic synchronous signals.

5 Claims, 5 Drawing Sheets

METHOD AND APPARATUS FOR DISTRIBUTING HAPTIC SYNCHRONOUS SIGNALS

FIELD

The exemplary embodiment(s) of the present invention relates to communications. More specifically, the exemplary embodiment(s) of the present invention relates to enhancing communication capabilities using haptic feedback.

BACKGROUND

Synchronizing and coordinating a group or groups of people can be challenging depending on the scenario. For example, requesting musicians to follow a conductor's tempo in a symphony orchestra can be difficult partially due to the fact that musicians typically cannot see conductor's baton movements while they are playing the instruments. Similar synchronization and/or coordination problem(s) can also be encountered in the scenarios such as a ballet performance, theatrical play, band performance, film or television production, or team sports.

In another scenario, synchronizing/coordinating a group or groups of people to carry out a mission in a coordinated manner is also challenging. For example, when several groups of special military units are in action to carry out a mission in a hostile environment, coordinating these groups is critical since their options to use audio, motion, and vision are often very limited.

SUMMARY

A method and apparatus for distributing haptic synchronizing signals using remote haptic devices are disclosed. In one embodiment, the master haptic device, which is a remote wearable or attachable device, is configured to distribute haptic synchronous signals to slave haptic devices. The haptic synchronous signals, for instance, may include information relating to a tempo for a piece of music. A haptic signal distribution system, for example, allows a master wearable haptic device to selectively distribute haptic synchronous signals to one or more groups of slave wearable haptic devices via a wireless communications network. Upon receipt of the haptic synchronous signals, each slave wearable haptic device generates a series of haptic feedback events having a rhythm of beats in response to the haptic synchronous signals. It should be noted that each group of slave haptic device includes one or more wearable or attachable haptic device.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiments of the present invention are described herein in the context of a method, system and apparatus for distributing synchronous haptic signals between a master haptic device and a group or groups of slave haptic devices.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

A haptic signal distribution system capable of distributing haptic synchronous signals includes a master haptic device and groups of slave haptic devices. In one embodiment, the master haptic device, which is a remote wearable or attachable device, is configured to distribute haptic synchronous signals to slave haptic devices. The haptic synchronous signals, for instance, may include information relating to a tempo for a piece of music. A haptic signal distribution system, for example, allows a master wearable haptic device to selectively distribute haptic synchronous signals to one or more groups of slave wearable haptic devices via a wireless communications network. Upon receipt of the haptic synchronous signals, each slave wearable haptic device generates a series of haptic feedback having a rhythm of beats in response to the haptic synchronous signals. It should be noted that each group of slave haptic device includes one or more wearable or attachable haptic device.

Figure 1:
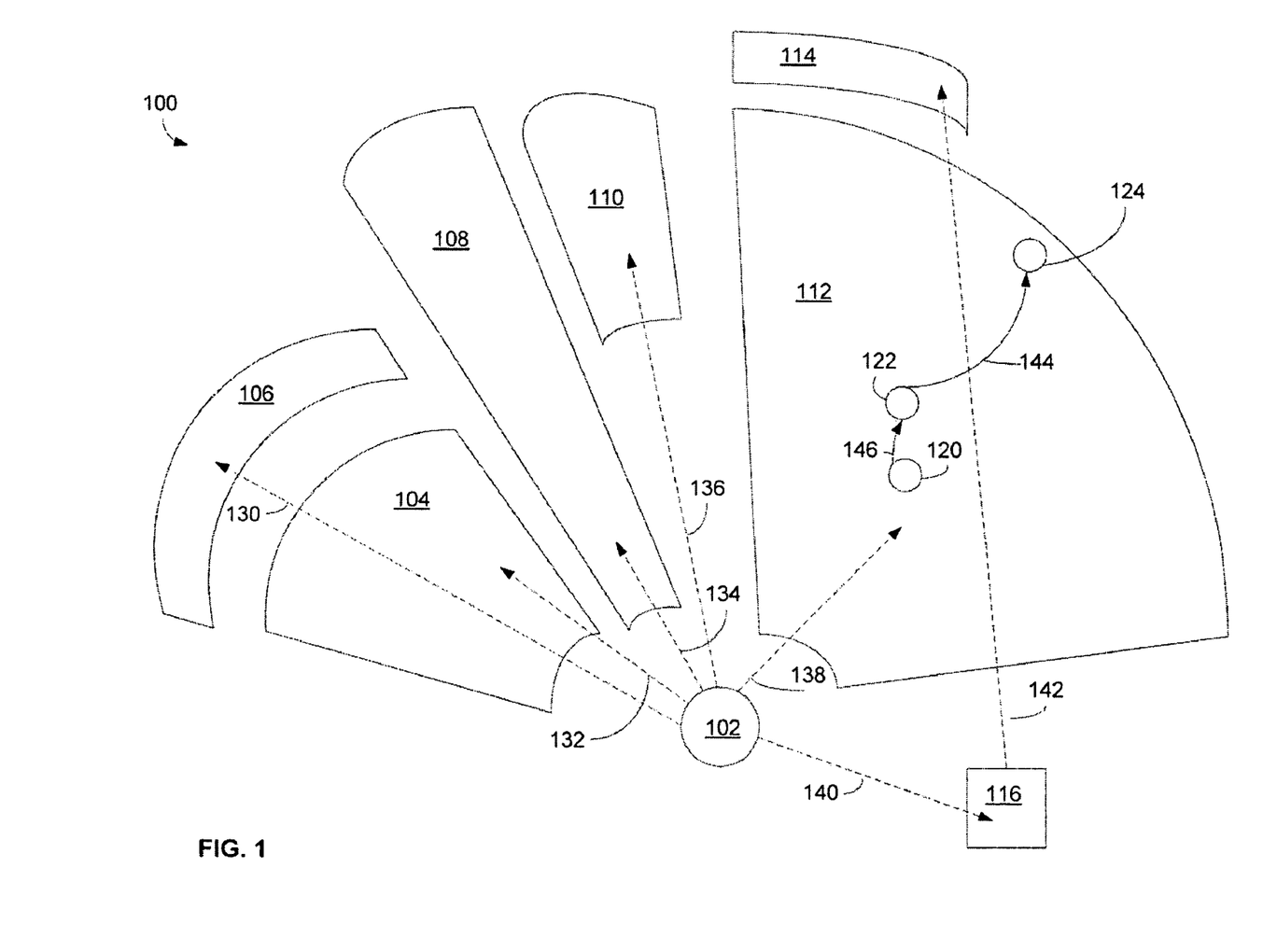
FIG. 1 is a block diagram illustrating a haptic timing distribution system using remote haptic interface devices in accordance with one embodiment of the present invention.

FIG. 1 is a block diagram illustrating a haptic timing distribution system 100 using remote haptic devices in accordance with one embodiment of the present invention. System 100 includes a master remote haptic device 102, six groups of slave remote haptic devices 104-114, and a relay station 116. Master remote haptic device 102 and slave remote haptic devices 104-114 are logically connected via wireless communication channels 130-146. It should be noted that remote haptic devices includes master remote haptic device(s) and slave remote haptic devices. Each group of slave remote haptic devices includes one or more remote haptic devices. It should be noted that the underlying concept of the exemplary embodiment of the present invention would not change if one or more blocks (circuits or mechanical devices) were added to or removed from system 100.

Master remote haptic device 102 may be attached to a body such as a hand or an instrument such as a baton. A function of master remote haptic device 102 is to generate a set of synchronous haptic signals and subsequently, transmit the set of synchronous haptic signals to one or more slave remote haptic devices 104-114. Upon selective receipt of the set of synchronous haptic signals, each one of the slave remote haptic devices 104-114 generates a series of haptic feedback in accordance with the set of synchronous haptic signals.

Alternatively, master remote haptic device 102 may be configured to generate different sets of synchronous haptic signals for different groups of the slave remote haptic devices. For instance, haptic signals generated for group 104 may contain different tempo than haptic signals generated for group 106. Master remote haptic device 102 uses various addressing mechanisms such as frequency variations or signed digital data packets to selectively address or target specific group or groups of slave remote haptic devices. After receipt of the haptic signals, each group of slave remote haptic devices generates a series of haptic feedback in accordance with the haptic signals.

Synchronous haptic signals, in one embodiment, are generated in accordance with a predefined haptic data, which may be stored in master remote haptic device 102. Alternatively, synchronous haptic signals may be generated in response to the movements or motions of master remote haptic device 102. Master remote haptic device 102, in this embodiment, includes one or more sensors such as accelerometer(s), wherein the sensors detect the movements of master remote haptic device 102. Detected movements are subsequently used to generate the synchronous haptic signals. For example, if a conductor wears a master remote haptic device 102 and points to a group of violins with a tempo, sensors in master remote haptic device 102 detect the motions of the conductor, and generate a set of haptic signals in accordance with detected motions. The set of haptic signals is subsequently sent to the violin group via a wireless communications network.

The wireless communications network may include one or more of Bluetooth, cellular (GPRS, CDMA, GSM, CDPD, 2.5G, 3G, etc), Ultra-WideBand (UWB), WiMax, ZigBee, and/or other ad-hoc/mesh network technologies. To reduce power consumption, system 100 can use a relay station 116 to amplify signal strength from master remote haptic device 102. For example, relay station 116 receives haptic signals from master remote haptic device 102 via wireless channel 140, and subsequently relays the received haptic signals to one or more groups of slave remote haptic devices 114 via wireless channel 142 after amplification.

System 100, in another embodiment, employs a regional mesh network to conserve power consumption for the master haptic device. It should be noted that master haptic device 102 may use battery power or rechargeable power supply, which has limited power supply. The regional mesh network enables slave haptic devices to share signal distribution tasks. In a regional mesh network scenario, one slave or head-slave remote haptic device, for instance, in a group is designated to receive synchronous haptic signals from the master remote haptic device, and it is responsible to populate the received haptic signals to the rest of slave remote haptic devices in the group. For example, when slave remote haptic device 120 receives the haptic signals from master remote haptic device 102 via wireless channel 138, it is responsible to forward the received haptic signals to the rest of slave remote haptic devices in group 112. Alternatively, the haptic signals may be populated in a predefined slave to slave sequence within a group. For instance, when slave remote haptic device 120 receives the haptic signals from master remote haptic device 102, it forwards the received haptic signals to slave remote haptic device 122, which in turn forwards the received haptic signals to slave remote haptic device 124, and so on until every slave remote haptic device in group 112 receives the haptic signals.

A function of the exemplary embodiment(s) of the present invention is to provide haptic feedback to user(s) inaudible temporal synchronization queues. For example, system 100, which can be configured to be a haptic metronome, is capable of providing haptic feedback as a time queue to imitate traditional audible/visual metronome used by musicians. A concept of haptic metronome can be used in many scenarios wherein temporal synchronization of one or more individuals (or objects) is critical. It is advantageous to use haptic feedback to produce a tempo when an individual is already devoting his/her vision and hearing to a task at hand. For example, a series of haptic feedback imitating desired tempo can be useful to musicians when they are playing in a symphony orchestra or musical band since their vision and hearing are already occupied with performance, musical notations and instruments.

System 100 is applicable to performing scenarios such as a singing, symphony orchestra, band, opera, theater, acrobatic performance, and the like. Team sports may be another area that can employ system 100. For example, system 100 may be useful to synchronize athletes in rowing team, swimmers, cyclists, synchronized swimmers and the like. As discussed earlier, system 100 is also useful in training settings, such as military exercise (coordination of soldiers, teams, vehicles, setting timing of maneuvers, action, etc.), speech/speaking therapy training (e.g. consistent tempo while speaking), training device for assembly/production personnel time schedule, training for queuing time-critical procures (plating, curing, etc), et cetera.

Figure 2:
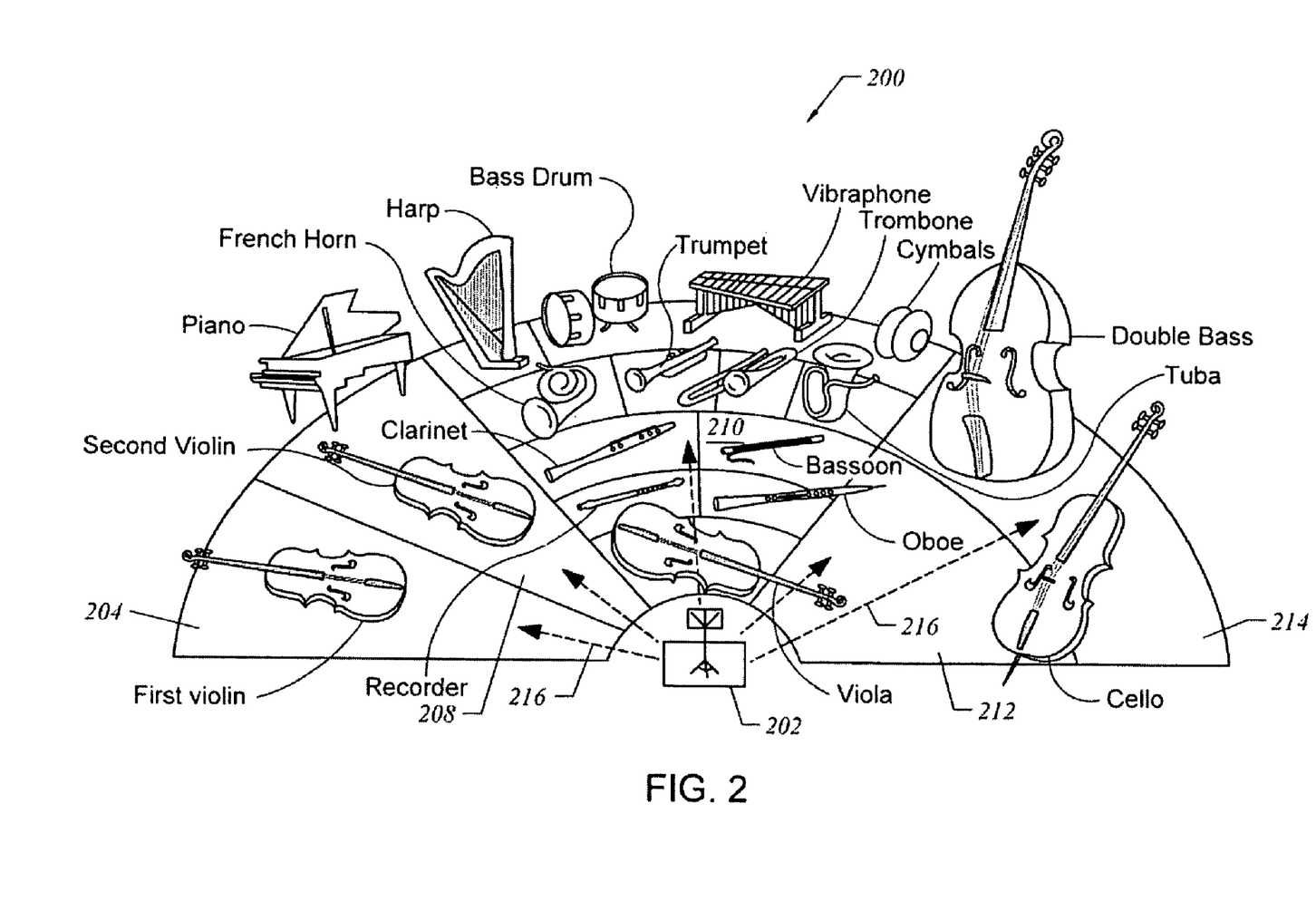
FIG. 2 is a block diagram illustrating a symphony orchestra using remote haptic interface devices in accordance with one embodiment of the present invention.

FIG. 2 is a block diagram illustrating a symphony orchestra 200 using remote haptic interface devices in accordance with one embodiment of the present invention. Symphony orchestra 200 includes a group of first violins 204, a group of second violins 208, a group of cellos 212, a group of double basses 214, a group of instruments 210, and a conductor 202. Instruments 210 include violas, harps, oboes, trumpets, et cetera. Conductor 202 wears a master remote haptic device, and musicians in various groups wear slave remote haptic devices for synchronization. It should be noted that the underlying concept of the exemplary embodiment of the present invention would not change if one or more blocks (circuits or mechanical devices) were added to or removed from symphony orchestra 200.

In one embodiment, wireless communications network 216 is used to provide logically connections between master remote haptic device worn by conductor 202 and groups of slave remote haptic devices worn by musicians or performers. Tempo or time synchronizing information may be selectively distributed to wearers of slave haptic device or haptic metronomes through either wired or wireless haptic signals. Musicians in symphony orchestra 200 (or a band), for example, can discretely wear a networked haptic metronome and feel the desired tempo regardless of whether they have a clear line of site to the conductor or hearing the lead tempo queue.

Referring back to FIG. 2, haptic reference tempo, which is the haptic feedback imitating reference tempo, distributed to haptic metronome wearers, could be derived automatically from a sensor such as an accelerometer embedded in the conductor's baton or worn on the conductor's hand. When the wearable remote haptic devices are calibrated correctly, the orchestra can keep an accurate common tempo while still following the nuances in tempo imparted by the conductor. It should be noted that the master remote haptic device worn by conductor 202 is capable of sending synchronous haptic signals to different group or groups slave remote haptic devices with unique addresses. For example, the synchronous haptic signals for group of first violin 204 should not interfere with the synchronous haptic signals for group of cello 212 because different addressing mechanisms are used.

To reduce interference between the groups, different frequencies may be used to separately address different groups. When an addressing scheme uses frequency variation, a group of slave remote haptic device does not see or notice a series of haptic signals for the neighboring group. For example, frequency variation addressing scheme can be particularly useful in situation such as a coordinated military operation. Other forms of addressing haptic information to specific groups are also possible. One example would be the use of address signed digital information packets in a scheme similar to those used to direct TCP/IP internet traffic to specific targets. It should be noted that haptic feedback for coordination can also be useful for scenarios as crane operators in large construction sites.

Figure 3A:
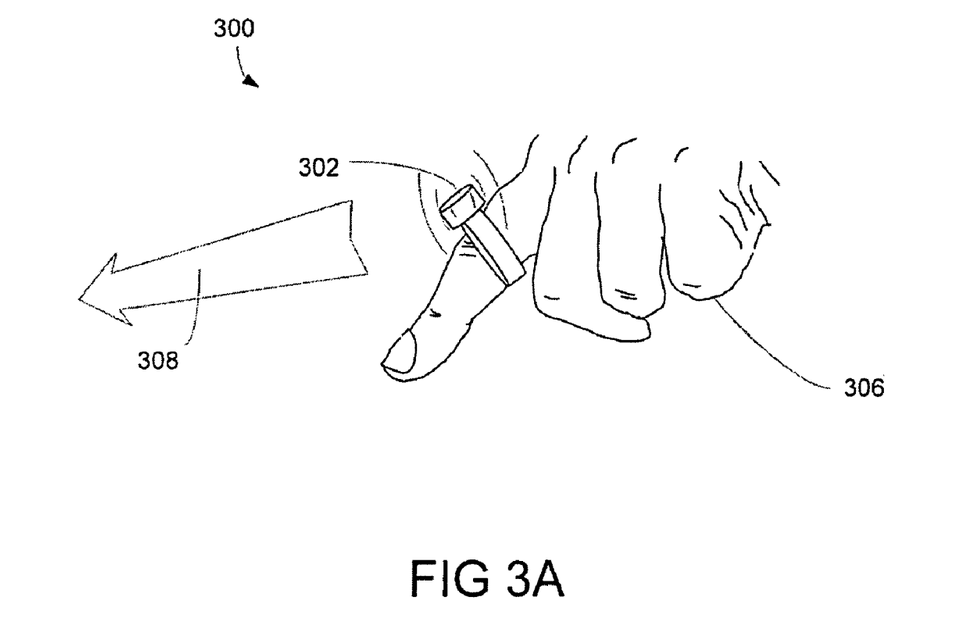
FIG. 3A illustrates a wearable haptic device for distributing synchronous haptic signals in accordance with one embodiment of the present invention.

FIG. 3A is a diagram 300 illustrating a wearable haptic device for distributing synchronous haptic signals in accordance with one embodiment of the present invention. Diagram 300 includes a wearable haptic ring 302 and a hand 106, wherein wearable haptic ring 302 is capable of sensing inputs from movements of hand 106. It should be noted that the underlying concept of the exemplary embodiment of the present invention would not change if one or more blocks (circuits or mechanical devices) were added to or removed from diagram 300.

Wearable haptic ring 302, also known as a master remote haptic device or a wearable remote interface device or the like, is designed and constructed in a ring shape that can be worn and/or fit on a finger as shown in FIG. 3A. Various physical designs of wearable haptic ring 302 may be used to fit thumbs, index fingers, middle fingers, ring fingers, and/or small fingers to accommodate different sizes and shapes of human fingers. It should be noted that the master remote haptic device can also be constructed in a shape as a bracelet or watch band. When hand 306 as a conductor's hand moves in the air to direct a musical performance, wearable haptic ring 302 senses the motion or movement of hand 306 using an accelerometer or similar sensor(s). Upon detecting motion(s) and/or movement(s), wearable haptic ring 302 generates a series of haptic signals 308 in response to the movements such as moving up, moving down, speed of motion, et cetera.

In one embodiment, wearable haptic ring 302 includes an actuator, which is capable of generating a haptic feedback to acknowledge or confirm which group or groups of the slave wearable haptic devices have been chosen to receive the haptic signals. Haptic or vibrotactile feedback may be provided through an actuator such as a piezo, shape memory alloy ("SMA"), eccentric rotating mass ("ERM") or linear resonant actuator ("LRA"), or the like. It should be noted that the terms "motion(s)" and "movement(s)" are used interchangeably herein. Also, the terms "detecting" and "sensing" are used interchangeably herein.

Wearable slave haptic devices, not shown in FIG. 3A, can be designed and constructed in a shape such as a ring, bracelet, necklace, and the like. Wearable slave haptic devices, in one embodiment, are used to receive synchronous haptic signals and generate vibrotactile or haptic feedback according to the synchronous haptic signals. A function of wearable slave haptic devices is to receive synchronous haptic information. Alternatively, wearable or attachable slave haptic devices can also transmit signals or haptic signals to other slave haptic devices and/or master haptic devices.

Alternatively, the haptic metronome can be a standalone device, or a node in a network of several of the haptic metronomes. In the standalone version, the device could be worn on the body or mounted in proximity to the user such that haptic feedback (such as vibration) produced at a set interval can be felt by the user.

Figure 3B:
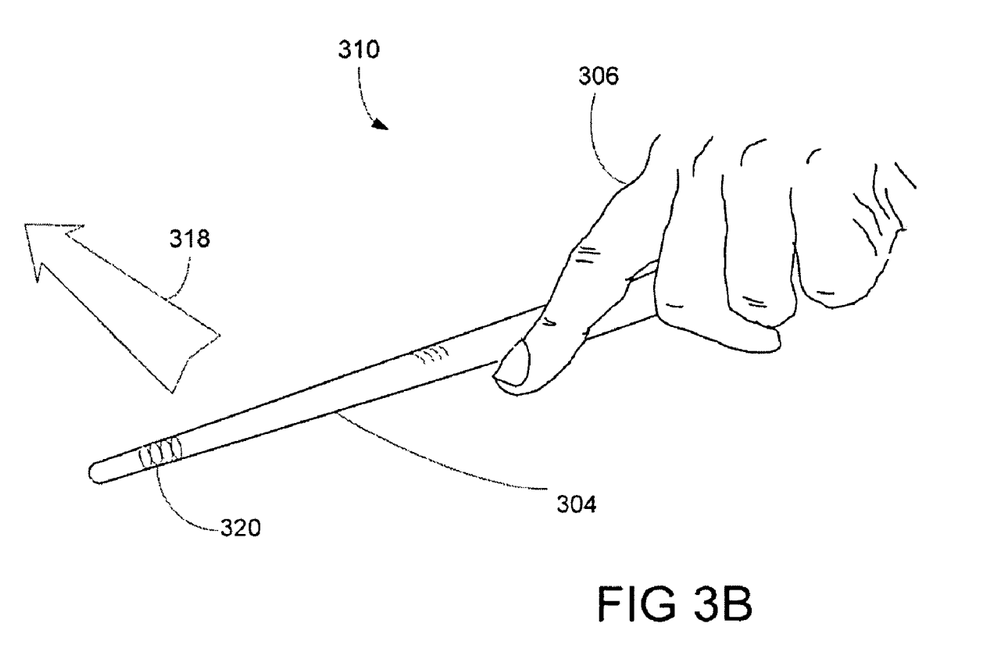
FIG. 3B illustrates an attachable haptic device for distributing synchronous haptic signals in accordance with one embodiment of the present invention.

FIG. 3B is a diagram 310 illustrating an attachable haptic device for distributing synchronous haptic signals in accordance with one embodiment of the present invention. Diagram 310 includes a haptic baton 304 and a hand 106, wherein an attachable haptic device 320 is installed or attached to haptic baton 304. Similar to wearable haptic ring 102, attachable haptic device 320 is capable of sensing movements of hand 106 via the motion of haptic baton 304. It should be noted that the underlying concept of the exemplary embodiment of the present invention would not change if one or more blocks (circuits or mechanical devices) were added to or removed from diagram 310.

Referring back to FIG. 3B, hand 306 holds haptic baton 304, wherein haptic baton 304 having an attachable haptic device 320 emits one or more sets of synchronous haptic signals 318 addressing to one or more groups of instruments in accordance with the movements of conductor's hand 306. For example, a conductor holds a tempo-sensing baton 304, which includes an accelerometer, can capture hand/baton motion. From the detected motions, a microprocessor in the attachable haptic device 320 extracts the desired tempo from the sensed data. A transmitter in the attachable haptic device 320 or baton 304 broadcasts the tempo information 318 to one or more slave haptic metronome(s) or devices. It should be noted that haptic baton 304 can also be referred to as the master remote haptic device.

Figure 4:
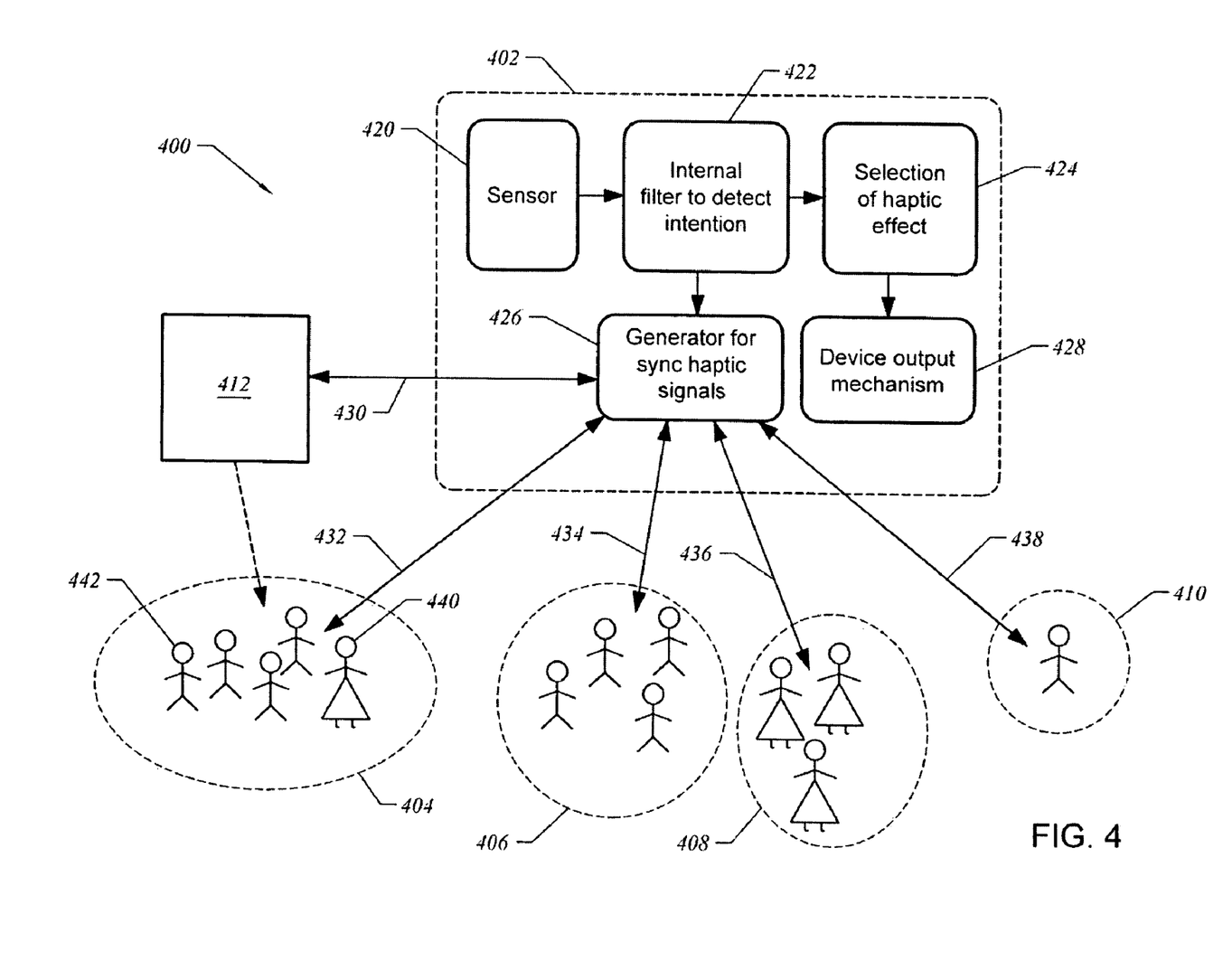
FIG. 4 is a block diagram illustrating a remote haptic device capable of distributing synchronous or coordinating haptic signals in accordance with one embodiment of the present invention.

FIG. 4 is a block diagram 400 illustrating a remote haptic device capable of distributing synchronous or coordinating haptic signals in accordance with one embodiment of the present invention. Diagram 400 includes a wearable or attachable haptic device 402, a first group of people 404, a second group of people 406, a third group of people 408, a fourth group of people 410, and a relay station 412, which is capable of amplifying and relaying haptic signals. It should be noted that the underlying concept of the exemplary embodiment of the present invention would not change if additional blocks such as power supply were added to or removed from diagram 400.

Each group of people may encompass a unique characteristic, and each group of people may receive a specific set of synchronous haptic signals. For example, first group 404 includes a group of men 442 and women 440, while second group 406 includes a group of men. While third group 408 includes a group of women, forth group 410 includes one man. Alternatively, first group 404 may be musicians playing first violin in a symphony orchestra, while second group 406 plays viola. Also, third group 408 may be cellists, while forth group is pianist. Also, first, second, third, and fourth groups are special military units that are ready to carry out a coordinated mission. It should be noted that other applications are also possible such as team sports and field operations.

Wearable haptic device 402 further includes a sensor 420, an internal filter 422, a selector 424, a generator 426, and a haptic output device 428. Sensor 420 is configured to detect position and motions of wearable haptic device 402. Filter 422 is used to remove extraneous movements or motions, which are considered as natural part of hand movements. Selector 424 selects one haptic effect from a group of haptic effects stored in a memory. For example, each group of the people may have a specific haptic effect to indicate the selection of the group. Device output device 428 is an actuator capable of generating haptic feedback in accordance with the information received from selector 424.

Generator 426 generates synchronous haptic signals in response to the filtered movements, and subsequently transmits the synchronous haptic signals to one or more groups such as groups 404-410 via various communication channels 432-438, which may be wired or wireless communications. For example, generator 426 may generate one or more unique synchronous haptic signals for one or more groups of people such as first group 404 and second group 406. Synchronous haptic signals for group 404 may be different from synchronous haptic signals for group 408 because, for instance, group 404 plays violins while group 408 plays bass drums.

A haptic metronome, in one embodiment, is constructed in accordance with the essential logic blocks of wearable haptic device 402. For example, the haptic metronome should include mechanical means for generating haptic feedback and programmable logic devices for data processing. Mechanical means include various types of haptic actuators such as a vibrating eccentric mass attached to a DC motor. The haptic metronome also uses one or more programmable logic devices for controlling the actuator in response to the movements such as setting a regular time interval of switching between an on (haptic feedback) state of the motor and off (no haptic feedback) state of the motor. Alternatively, the haptic metronome can also be used as a standalone device, which may further include an interface that allows the adjustment of the haptic feedback rate (i.e., the metronome tempo).

One or more wired or wireless communications networks may be used to facilitate and distribute synchronous haptic signals between a master haptic metronome and groups of slave haptic metronomes. The master haptic metronome should perform similar function as the wearable master remote haptic device and the slave haptic metronomes should perform similar functions as the wearable slave remote haptic devices. For example, a networked haptic metronome uses communications circuitry to receive commanded tempo from a master device, and subsequently, forwards feedback information relating to tempo and time data to a centralized location or other nodes in the network for further distributions. Using a relay station 412 or central distribution network can enlarge the coverage of the communication area. For a concept of a wireless networked haptic metronome, it could operate with a central distribution point to all nodes or in a mesh-network fashion in which each haptic metronome acts as a receiver as well as a transmitter to extend the coverage to all nodes.

The exemplary embodiment(s) of the present invention includes various processing steps which will be described below. The steps of the embodiments may be embodied in machine or computer executable instructions. The instructions can be used to cause a general purpose or special purpose system, which is programmed with the instructions, to perform the steps of the present invention. Alternatively, the steps of the present invention may be performed by specific hardware components that contain hard-wired logic for performing the steps, or by any combination of programmed computer components and custom hardware components. While embodiments of the present invention will be described with reference to the Internet, the method and apparatus described herein is equally applicable to other network infrastructures or other data communications environments.

Figure 5:
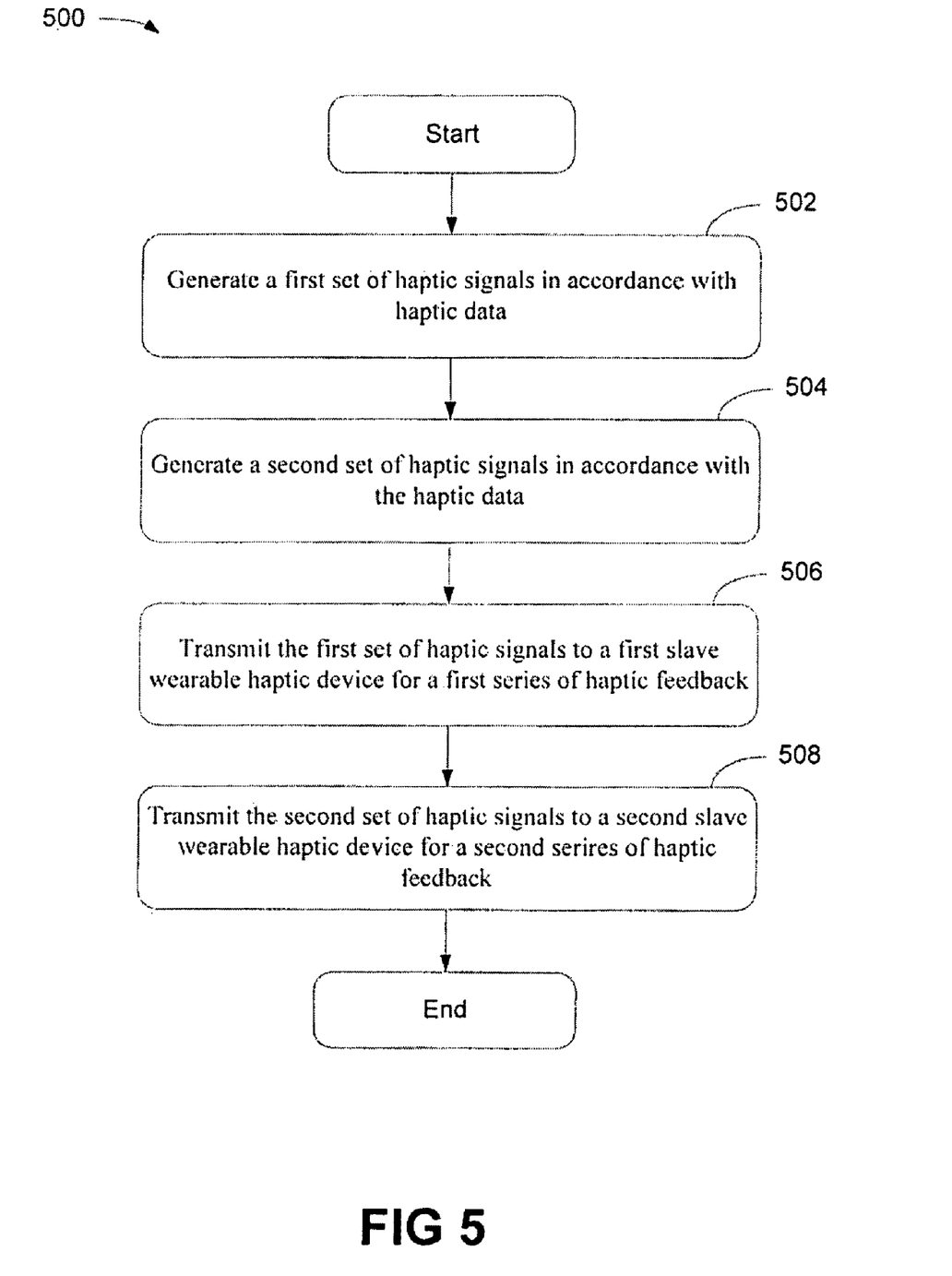
FIG. 5 is a flowchart illustrating a process of distributing synchronous haptic signals using remote haptic devices in accordance with one embodiment of the present invention.

FIG. 5 is a flowchart 500 illustrating a process of distributing synchronous haptic signals using remote haptic devices in accordance with one embodiment of the present invention. At block 502, the process generates a first set of haptic signals in accordance with haptic data. In one embodiment, the first set of haptic signals includes information relating to inaudible temporal synchronization queues. Haptic data, in one aspect, is fetched or retrieved from a storage location in a master wearable haptic device. Alternatively, haptic data may be generated in accordance with the movements and speed of the movements of the master remote haptic device. In one embodiment, the process is capable of sensing movements of a master wearable haptic device and producing the haptic data in response to the movements of the master wearable haptic device. After block 502, the process moves to the next block.

At block 504, the process generates a second set of haptic signals in accordance with the haptic data. It should be noted that first set of haptic signals contain different destination address than the second set of haptic signals. Various addressing mechanisms may be used depending on the application of the exemplary embodiments of the present invention. For example, the first set of haptic signals may be transmitted in a different radio frequency than the second set of haptic signals. After block 504, the process proceeds to the next block.

At block 506, the process transmits the first set of haptic signals to a first slave wearable haptic device for generating a first series of haptic feedback. In one embodiment, the first set of haptic signals includes a destination address, indicating which group or groups of the slave wearable haptic devices should receive the first set of haptic signals. It should be noted that the first slave wearable haptic device may belong to a group. After block 506, the process proceeds to the next block.

At block 508, the process transmits the second set of haptic signals to a second slave wearable haptic device for generating a second series of haptic feedback. In one embodiment, the process is capable of synchronizing a master clock in the master wearable haptic device with a slave clock in the slave wearable haptic device using clocking signals or global positioning system ("GPS"). It should be noted that upon receipt of the haptic signals or synchronous haptic signals, the slave wearable haptic devices generate haptic feedback to imitating music tempo in accordance with the haptic signals. It should be noted that slave wearable haptic device, in one embodiment, is also capable of communicating to the master wearable haptic device via wireless signals. For example, the slave wearable haptic device can inform the master wearable haptic device that it is woken from a hibernating state.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A haptic coordinating system, comprising:
a master wearable haptic device configured to distribute one or more sets of haptic coordinating signals via a wireless communications network, wherein the master wearable haptic device is configured to attach to an object, wherein the master wearable haptic device further includes a sensor adapted to sense movements of the master wearable haptic device, wherein the sensor is configured to generate haptic coordinating signals in accordance with the movements detected; and
a plurality of slave wearable haptic device, logically coupled to the master wearable haptic device, configured to selectively receive at least a set of haptic coordinating signals and generate haptic feedback in response to the haptic coordinating signals.

2. The system of claim 1, wherein the master wearable haptic device is configured to attach to a part of body.

3. The system of claim 1,
wherein the master wearable haptic device includes a master clock using global positioning system ("GPS") to synchronize the master clock; and
wherein each of the plurality of slave wearable haptic devices includes a slave clock using GPS to synchronize the slave clock.

4. The system of claim 1, wherein the plurality of slave wearable haptic device is divided into multiple groups, wherein each group of the multiple groups of slave wearable haptic devices is configured to receive one or more sets of haptic coordinating signals.

5. The system of claim 1, wherein each set of haptic coordinating signals further includes a recipient address for addressing targeted group of slave wearable haptic devices.

* * * * *